US009621515B2

(12) United States Patent
Diehl et al.

(10) Patent No.: US 9,621,515 B2
(45) Date of Patent: *Apr. 11, 2017

(54) KERNEL-LEVEL SECURITY AGENT

(71) Applicant: CrowdStrike, Inc., Irvine, CA (US)

(72) Inventors: David F. Diehl, Minneapolis, MN (US); Dmitri Alperovitch, Gaithersburg, MD (US); Ion-Alexandru Ionescu, San Francisco, CA (US); George Robert Kurtz, Ladera Ranch, CA (US)

(73) Assignee: CrowdStrike, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/709,779

(22) Filed: May 12, 2015

(65) Prior Publication Data
US 2015/0244679 A1  Aug. 27, 2015

Related U.S. Application Data

(63) Continuation of application No. 13/492,672, filed on Jun. 8, 2012, now Pat. No. 9,043,903.

(51) Int. Cl.
*H04L 29/06* (2006.01)
*G06F 21/56* (2013.01)
(Continued)

(52) U.S. Cl.
CPC ............ *H04L 63/0245* (2013.01); *G06F 9/46* (2013.01); *G06F 21/554* (2013.01); *G06F 21/56* (2013.01);
(Continued)

(58) Field of Classification Search
None
See application file for complete search history.

(56) References Cited

U.S. PATENT DOCUMENTS

| 6,009,274 A | 12/1999 | Fletcher et al. |
| 6,052,723 A | 4/2000 | Ginn |

(Continued)

FOREIGN PATENT DOCUMENTS

| EP | 0648353 A1 | 4/1995 |
| KR | 1020100085424 A | 7/2010 |

(Continued)

OTHER PUBLICATIONS

King et al, "Backtracking Intrusions", ACM SOSP, Oct. 2003, vol. 37, Issue 5, 14 pgs.

(Continued)

*Primary Examiner* — Christopher Revak
(74) *Attorney, Agent, or Firm* — Lee & Hayes, PLLC

(57) ABSTRACT

A kernel-level security agent is described herein. The kernel-level security agent is configured to observe events, filter the observed events using configurable filters, route the filtered events to one or more event consumers, and utilize the one or more event consumers to take action based at least on one of the filtered events. In some implementations, the kernel-level security agent detects a first action associated with malicious code, gathers data about the malicious code, and in response to detecting subsequent action(s) of the malicious code, performs a preventative action. The kernel-level security agent may also deceive an adversary associated with malicious code. Further, the kernel-level security agent may utilize a model representing chains of execution activities and may take action based on those chains of execution activities.

30 Claims, 5 Drawing Sheets

(51) Int. Cl.
*G06F 9/46* (2006.01)
*G06F 21/55* (2013.01)
*H04L 12/24* (2006.01)

(52) U.S. Cl.
CPC .......... *G06F 21/566* (2013.01); *G06F 21/567* (2013.01); *G06F 21/568* (2013.01); *H04L 41/0803* (2013.01); *H04L 63/1441* (2013.01)

(56) References Cited

U.S. PATENT DOCUMENTS

| | | | |
|---|---|---|---|
| 6,088,804 | A | 7/2000 | Hill et al. |
| 6,463,584 | B1 | 10/2002 | Gard et al. |
| 7,099,948 | B2 | 8/2006 | Tormasov et al. |
| 7,478,237 | B2 | 1/2009 | Costea et al. |
| 7,571,448 | B1* | 8/2009 | Sallam ................ G06F 9/44521 |
| | | | 717/163 |
| 7,765,400 | B2 | 7/2010 | Costea et al. |
| 7,765,410 | B2 | 7/2010 | Costea et al. |
| 7,890,664 | B1 | 2/2011 | Tao et al. |
| 7,908,656 | B1* | 3/2011 | Mu ..................... G06F 21/6218 |
| | | | 726/22 |
| 8,065,728 | B2 | 11/2011 | Wang et al. |
| 8,234,693 | B2 | 7/2012 | Stahl et al. |
| 8,321,677 | B2 | 11/2012 | Morten |
| 8,407,279 | B2 | 3/2013 | Kang |
| 8,413,261 | B2 | 4/2013 | Nemoy et al. |
| 8,533,830 | B1 | 9/2013 | Dalcher |
| 8,539,584 | B2 | 9/2013 | Ramalingam |
| 8,572,247 | B2 | 10/2013 | Larson et al. |
| 8,577,616 | B2 | 11/2013 | Dunlap |
| 8,578,477 | B1 | 11/2013 | Lin et al. |
| 8,762,298 | B1 | 6/2014 | Ranjan et al. |
| 8,776,227 | B1 | 7/2014 | Glick et al. |
| 8,789,034 | B1 | 7/2014 | Emelyanov et al. |
| 9,043,903 | B2* | 5/2015 | Diehl ....................... G06F 9/46 |
| | | | 726/22 |
| 2001/0044904 | A1* | 11/2001 | Berg ....................... G06F 21/52 |
| | | | 726/26 |
| 2002/0023211 | A1 | 2/2002 | Roth et al. |
| 2003/0112781 | A1 | 6/2003 | Kermode et al. |
| 2004/0107416 | A1 | 6/2004 | Buban et al. |
| 2005/0159998 | A1 | 7/2005 | Buyukkokten et al. |
| 2006/0156380 | A1 | 7/2006 | Gladstone et al. |
| 2006/0174323 | A1 | 8/2006 | Brown et al. |
| 2007/0022287 | A1 | 1/2007 | Beck et al. |
| 2007/0094496 | A1 | 4/2007 | Burtscher |
| 2007/0143850 | A1 | 6/2007 | Kraemer et al. |
| 2007/0250817 | A1 | 10/2007 | Boney |
| 2008/0034429 | A1* | 2/2008 | Schneider ............. G06F 21/566 |
| | | | 726/23 |
| 2008/0189796 | A1 | 8/2008 | Linn et al. |
| 2008/0209505 | A1 | 8/2008 | Ghai et al. |
| 2008/0253287 | A1 | 10/2008 | Gupta et al. |
| 2008/0282198 | A1 | 11/2008 | Brooks et al. |
| 2008/0301669 | A1 | 12/2008 | Rao et al. |
| 2009/0070878 | A1 | 3/2009 | Wang et al. |
| 2009/0094039 | A1 | 4/2009 | MacDonald et al. |
| 2009/0119681 | A1 | 5/2009 | Bhogal et al. |
| 2009/0216806 | A1 | 8/2009 | Feuerstein et al. |
| 2009/0307142 | A1 | 12/2009 | Mardikar |
| 2010/0074446 | A1 | 3/2010 | Fuchs et al. |
| 2010/0169973 | A1 | 7/2010 | Kim et al. |
| 2010/0235622 | A1 | 9/2010 | Robinton et al. |
| 2010/0235879 | A1 | 9/2010 | Burnside et al. |
| 2010/0312890 | A1 | 12/2010 | Bernosky |
| 2011/0029772 | A1 | 2/2011 | Fanton et al. |
| 2011/0099632 | A1 | 4/2011 | Beck et al. |
| 2011/0145598 | A1 | 6/2011 | Smith et al. |
| 2011/0209219 | A1 | 8/2011 | Zeitlin et al. |
| 2011/0239306 | A1 | 9/2011 | Avni et al. |
| 2012/0005542 | A1 | 1/2012 | Petersen et al. |
| 2012/0167161 | A1 | 6/2012 | Kim |
| 2012/0246297 | A1 | 9/2012 | Shanker et al. |
| 2012/0255012 | A1 | 10/2012 | Sallam |
| 2013/0291112 | A1 | 10/2013 | Shue et al. |
| 2013/0312095 | A1 | 11/2013 | Edwards et al. |
| 2013/0333040 | A1 | 12/2013 | Diehl et al. |
| 2014/0007190 | A1 | 1/2014 | Alperovitch et al. |
| 2014/0109226 | A1 | 4/2014 | Diehl et al. |
| 2014/0317405 | A1* | 10/2014 | Johnson ............. H04L 63/0227 |
| | | | 713/164 |
| 2015/0007316 | A1 | 1/2015 | Ben-Shalom et al. |
| 2015/0101044 | A1* | 4/2015 | Martin .................. G06F 21/552 |
| | | | 726/22 |
| 2015/0128206 | A1* | 5/2015 | Ben Haim ............ G06F 21/566 |
| | | | 726/1 |
| 2015/0178071 | A1 | 6/2015 | Pavlik et al. |
| 2015/0268947 | A1 | 9/2015 | Ionescu |
| 2015/0326614 | A1 | 11/2015 | Alperovitch et al. |
| 2015/0356301 | A1* | 12/2015 | Diehl .................... G06F 21/577 |
| | | | 726/22 |
| 2016/0170740 | A1 | 6/2016 | Ionescu |

FOREIGN PATENT DOCUMENTS

| | | |
|---|---|---|
| KR | 101038048 | 6/2011 |
| WO | WO2012107557 | 8/2012 |
| WO | WO2012135192 | 10/2012 |
| WO | WO2013164821 | 11/2013 |

OTHER PUBLICATIONS

Final Office Action for U.S. Appl. No. 13/492,672, mailed on Oct. 23, 2014, David F. Diehl, "Kernel-Level Security Agent", 15 pages.
Final Office Action for U.S. Appl. No. 13/538,439, mailed on Dec. 2, 2014, Dmitri Alperovitch, "Social Sharing of Security Information in a Group", 13 pages.
Final Office Action for U.S. Appl. No. 13/728,746, mailed on Dec. 3, 2014, David F. Diehl, "Real-Time Representation of Security-Relevant System State", 22 pages.
Office Action for U.S. Appl. No. 13/728,746, mailed on Apr. 14, 2014, David F. Diehl, "Real-Time Representation of Security-Relevant System State", 17 pages.
Office Action for U.S. Appl. No. 13/492,672, mailed on Apr. 7, 2014, David F. Diehl, "Kernel-Level Security Agent", 8 pages.
Office action for U.S. Appl. No. 13/538,439, mailed on Jun. 30, 2014, Alperovitch et al., "Social Sharing of Security Information in a Group", 13 pages.
PCT Search Report and Written Opinion mailed Apr. 29, 2014 for PCT application No. PCT/US13/75856, 13 pages.
PCT Search Report and Written Opinion mailed Sep. 17, 2013 for PCT application No. PCT/US2013/040420 , 12 pages.
PCT Search Report and Written Opinion mailed Sep. 26, 2013 for PCT Application No. PCT/US13/40428, 13 pages.
Office Action for U.S. Appl. No. 13/538,439, mailed on Apr. 23, 2015, Dmitri Alperovitch, "Social Sharing of Security Information in a Group", 6 pages.
PCT Search Report and Written Opinion mailed Apr. 28, 2015 for PCT application No. PCT/US2015/013522, 13 pages.
Supplementary European Search Report mailed Nov. 3, 2015 for European Patent Application No. 13800519.4, 7 pages.
Singapore Office Action mailed Nov. 17, 2015 for Singapore patent application No. 11201408279Q, a counterpart foreign application of U.S. Appl. No. 13/538,439, 6 pages.
Singapore Office Action mailed Sep. 28, 2015 for Singapore patent application No. 11201407292Q, a counterpart foreign application of U.S. Pat. No. 9,043,903, 6 pages.
PCT Search Report and Written Opinion mailed Jun. 1, 2015 for PCT application No. PCT/US2015/020187, 13 pages.
Office Action for U.S. Appl. No. 14/140,323, mailed on Jul. 31, 2015, David F. Diehl, "Kernel-Level Security Agent", 9 pages.
Extended European Search Report mailed Jun. 2, 2016 for European patent application No. 13808592.3, 12 pages.
Offce action for U.S. Appl. No. 14/220,362, mailed on May 25, 2016, Ionescu, "Integrity Assurance and Rebootless Updating During Runtime", 12 pages.

(56) References Cited

OTHER PUBLICATIONS

Office action for U.S. Appl. No. 14/792,177, mailed on Jun. 30, 2016, Alperovitch et al., "Social Sharing of Security Information in a Group", 11 pages.
Partial Supplementary European Search Report mailed Jan. 25, 2016 for European Patent Application No. 13808592.3, 6 pages.
Supplementary Extended European Search Report mailed Feb. 16, 2016 for European patent application No. 1380051934, 22 pages.
Office action for U.S. Appl. No. 14/140,323, mailed on May 11, 2016, Diehl et al., "Kernel-Level Security Agent", 15 pages.
Office action for U.S. Appl. No. 14/220,362, mailed on Sep. 16, 2016, Ionescu, "Integrity Assurance and Rebootless Updating During Runtime", 14 pages.
Popenko, S. et al., "Driver to Hide Processes and Files", CodeProject, Aug. 17, 2009, 26 pgs.
Office action for U.S. Appl. No. 14/792,177, mailed on Dec. 16, 2016, Alperovitch et al., "Social Sharing of Security Information in a Group", 12 pages.
Office action for U.S. Appl. No. 15/051,461, mailed on Dec. 8, 2016, Ionescu, "Integrity Assurance and Rebootless Updating During Runtime", 9 pages.
Office action for U.S. Appl. No. 14/220,362, mailed on Feb. 7, 2017, Ionescu, "Integrity Assurance and Rebootless Updating During Runtime", 16 pages.
Extended European Search Report mailed Dec. 6, 2016 for European patent application No. 16179598.4, 7 pages.

* cited by examiner

KERNEL-LEVEL SECURITY AGENT

CROSS REFERENCE TO RELATED APPLICATIONS

This patent application is a continuation and claims priority to U.S. Utility patent application with Ser. No. 13/492,672 filed Jun. 8, 2012. Application Ser. No. 13/492,672, which is now U.S. Pat. No. 9,043,903, and is fully incorporated herein by reference.

This patent application is also related to U.S. patent application Ser. No. 14/140,323, filed Dec. 24, 2013. application Ser. No. 14/140,323 is fully incorporated herein by reference.

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

Current approaches to these threats include traditional antivirus software, such as Symantec Endpoint Protection, that utilizes signature-based and heuristic techniques to detect malware. These techniques involve receiving malware definitions from a remote security service and scanning a host device on which the antivirus software is implemented for files matching the received definitions.

There are a number of problems with traditional antivirus software, however. Purveyors of malware are often able to react more quickly than vendors of security software, updating the malware to avoid detection. Also, there are periods of vulnerability when new definitions are implemented or when the security software itself is updated. During these periods of vulnerability, there is currently nothing to prevent the intrusion and spread of the malware. Further, antivirus software tends to be a user mode application that loads after the operating system, giving malware a window to avoid detection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
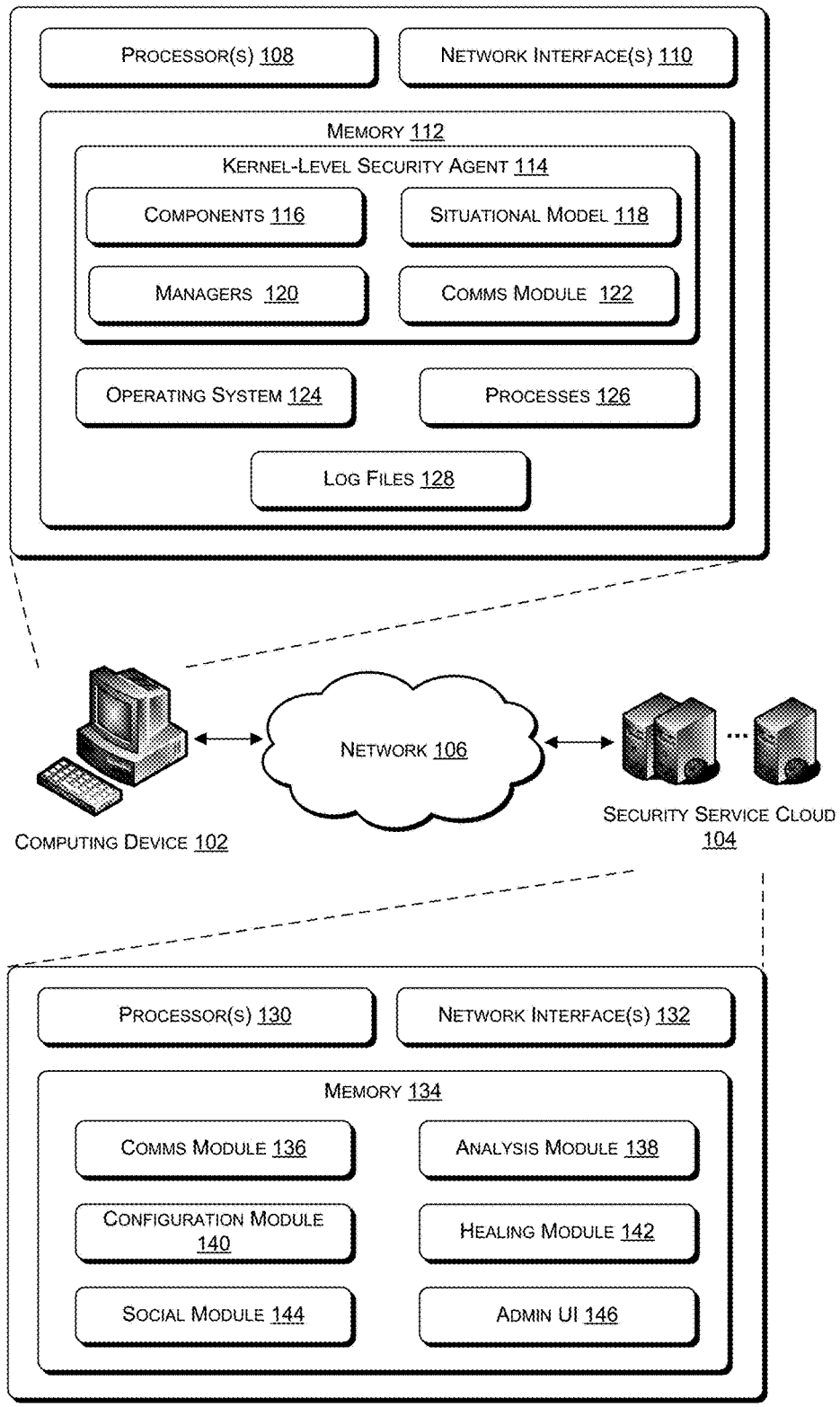
FIG. 1 illustrates an example network connecting a computing device configured with a kernel-level security agent to a security service cloud.

This disclosure describes, in part, a kernel-level security agent that operates on a host computing device, including mobile and embedded systems, as a virtual machine/shadow operating system. The kernel-level security agent loads before the operating system of the host computing device. In fact, the kernel-level security agent is loaded very early in the boot-time of the host computing device, by some of the first few dozen instructions. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In various embodiments, the kernel-level security agent may be installed on the host computing device in the form of a driver and may be received from a security service. Such a security service may be implemented as a cloud of security service devices (referred to herein as a "security service cloud" or a "remote security system"). In addition to installing the kernel-level security agent, the security service cloud may receive notifications of observed events from the kernel-level security agent, may perform analysis of data associated with those events, may perform healing of the host computing device, and may generate configuration updates and provide those updates to the kernel-level security agent. These interactions between the kernel-level security agent and the security service cloud enable a detection loop that defeats the malware update loop of malware developers (also referred to herein as "adversaries") and further enable the kernel-level security agent to perform updating while continuously monitoring, eliminating dangerous gaps in security coverage. Also, as used herein, the term "adversaries" includes not only malware developers but also exploit developers, builders and operaters of an attack infrastructure, those conducting target reconnaissance, those executing the operation, those performing data exfiltration, and/or those maintaining persistence in the network, etc. Thus the "adversaries" can include numerous people that are all part of an "adversary" group. Also, the detection loop is focused on defeating not just the malware update loop but all aspects of this attack—the changing of the malware, the changing of the exploits, attack infrastructure, persistence tools, attack tactics, etc.

The detection loop of the kernel-level security agent and security service cloud is enabled by an agent architecture designed in accordance with the principles of the well-known OODA-loop (i.e., observe-orient-detect-act-loop). Rather than using fixed signatures to make quick determinations and responses, the kernel-level security agent observes and analyzes all semantically-interesting events that occur on the host computing device. Kernel-level security agent components known as collectors receive notifications of these semantically-interesting events (e.g., file writes and launching executables) from host operating system hooks or filter drivers, from user-mode event monitors, or from threads monitoring log files or memory locations. These events may then be filtered using configurable filters of the kernel-level security agent and routed/dispatched to event consumers of the kernel-level security agent, such as correlators or actor components. A correlator component notes the fact of the occurrence of the filtered events. An actor component may, for example, gather forensic data associated with an event and update a situation model of the kernel-level security agent with the forensic data. The situation model represents chains of execution activities and genealogies of processes, tracking attributes, behaviors, or patterns of processes executing on the host computing device and enabling an event consumer of the kernel-level security agent to determine when an event is interesting. Upon determining an occurrence of such an interesting event, the event consumer can perform any or all of updating the situational model and performing further observation, generating an event to represent the determination that an interesting event has occurred, notifying the security service cloud of the interesting event, or healing the host computing device by halting execution of a process associated with malicious code or deceiving an adversary associated with the malicious code. In various embodiments, any or all of the observing, filtering, routing/dispatching, and/or utilizing of event consumers may occur in parallel with respect to multiple events.

By looping based on significant events and chains of execution activities of the host computing device rather than on fixed signatures, the kernel-level security agent is able to better detect processes associated with malicious code. While adversaries can easily change malware to avoid signature-based detection, it is significantly more difficult to avoid detection by an agent that monitors and analyzes significant events. Further, by observing events for some time, and not immediately performing preventative action in response to detecting an action associated with malicious code, the kernel-level security agent may fool adversaries into thinking that the malware is working and, when the malware is later halted or deceived, the adversaries may first think to debug their own malware.

In various embodiments, as mentioned, the kernel-level security agent performs updating while continuously monitoring, eliminating dangerous gaps in security coverage. Responsive to receiving a configuration update from the security service cloud, a configuration manager of the kernel-level security agent may invoke a component manager of the kernel-level security agent to load a new component that updates or replaces an existing component. The existing component continues to participate in threat detection while the new component loads, thus ensuring uninterrupted threat detection.

In some embodiments, the kernel-level security agent includes an integrity manager that performs threat detection while core components of the kernel-level security agent or the managers themselves are updated or replaced. Thus, once the kernel-level security agent is installed, some components or manager(s) of the kernel-level security agent are continually involved in detecting threats to the host computing device.

Example Network and Devices

FIG. 1 illustrates an example network connecting a computing device configured with a kernel-level security agent to a security service cloud that provides configuration, analysis, and healing to the computing device through the kernel-level security agent. As illustrated in FIG. 1, a computing device 102 may interact with a security service cloud 104 over a network 106. In addition to components such as processors 108, network interfaces 110, and memory 112, the computing device 102 may implement a kernel-level security agent 114, which is shown stored in the memory 112 and executable by the processor(s) 108. The kernel-level security agent 114 may include components 116 to observe events and determine actions to take based on those events, a situational model 118 to track attributes and behaviors of processes of the computing device 102, managers 120 to update the components 116 and provide continual detection during updates, and a communications module 122 to communicate with the security service cloud 104. In addition to the kernel-level security agent 114, the computing device 102 may include an operating system 124, processes 126, and log files 128.

In various embodiments, devices of the security service cloud 104 may also include processors 130, network interfaces 132, and memory 134. The memory 134 may store a communications module 136 to communicate with the kernel-level security agent 114 of the computing device 102, an analysis module 138 to evaluate interesting events identified by the kernel-level security agent 114, a configuration module 140 to generate and provide configuration updates to the kernel-level security agent 114, a healing module 142 to halt or deceive malware executing on the computing device 102, a social module 144 to notify other computing devices or users of the malware detected on the computing device 102, and an administrative user interface (UI) to enable an administrator associated with the security service cloud 104 to view notifications of observed events and make decisions regarding appropriate responses to those events.

In various embodiments, the computing device 102 and devices of the security service cloud 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device(s) of the security service cloud 104 represent a plurality of computing devices working in communication, such as a cloud computing network of nodes. When implemented on multiple computing devices, the security service cloud 104 may distribute the modules and data 136-146 of the security service cloud 104 among the multiple computing devices. In some implementations, one or more of the computing device(s) of the computing device 102 or the security service cloud 104 represents one or more virtual machines implemented on one or more computing devices.

In some embodiments, the network 106 may be include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, the computing device 102 and the security service cloud 104 communicate over the network using a secure protocol (e.g., https) and/or any other protocol or set of protocols, such as the transmission control protocol/Internet protocol (TCP/IP).

As mentioned, the computing device 102 includes processor(s) 108 and network interface(s) 110. The processor(s) 108 may be or include any sort of processing unit, such as a central processing unit (CPU) or a graphic processing unit (GPU). The network interface(s) 110 allow the computing device 102 to communicate with one or both of the security service cloud 104 and other devices. The network interface(s) 110 may send and receive communications through one or both of the network 106 or other networks. The network interface(s) 110 may also support both wired and wireless connection to various networks.

The memory 112 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 112 includes a kernel-level security agent 114. The kernel-level security agent 114 operates as a virtual machine/shadow operating system. The kernel-level security agent 114 loads before the operating system 124 of the computing device 102. In fact, the kernel-level security agent 114 is loaded very early in the boot-time of the computing device 102, by some of the first few dozen instructions.

As illustrated in FIG. 1, the kernel-level security agent 114 includes components 116 to observe events and determine appropriate action(s) to take based on those events and on a situational model 118, as well as the situational model 118, managers 120 to receive configuration updates from the security service cloud 104 and to perform the updates while continuing to observe events, and a communications module 122 to communicate with the security service cloud. Also the kernel-level security agent 114 may include a hypervisor or one or more pre-boot components. The pre-boot components may or may not leverage hardware provided security features. These modules and data 116-122 of the kernel-level security agent 114 are described in further detail below with reference to the kernel-level security agent architecture 200 of FIG. 2.

As is further shown in FIG. 1, the memory 112 includes an operating system 124 of computing device 102. The operating system 124 may include hooks or filter drivers that allow other processes, such as the kernel-level security agent 114 to receive notifications of the occurrence or non-occurrence of events such as file creates, reads and writes, launching of executables, etc. The memory 112 also includes processes 126 and log files 128 that are monitored by the kernel-level security agent 114.

As mentioned, the devices of the security service cloud 104 include processor(s) 130 and network interface(s) 132. The processor(s) 130 may be or include any sort of processing units, such as central processing units (CPU) or graphic processing units (GPU). The network interface(s) 132 allow the devices of the security service cloud 104 to communicate with one or both of the computing device 102 and other devices. The network interface(s) 132 may send and receive communications through one or both of the network 106 or other networks. The network interface(s) 132 may also support both wired and wireless connection to various networks.

The memory 134 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 134 includes a communications module 136. The communications module may comprise any one or more protocol stacks, such as a TCP/IP stack, device drivers to network interfaces 132, and any other modules or data that enable the devices of the security service cloud 104 to send and receive data over network 106.

In various embodiments, analysis module 138 may receive notifications of interesting events from kernel-level security agents 114 of computing devices, as well as forensic data associated with those interesting events. Upon receiving notification of an interesting event, the analysis module 138 may determine if related notifications have been received from other kernel-level security agents 114 of other computing devices 102. Also or instead, the analysis module 138 may evaluate the interesting event based on one or more rules or heuristics. The analysis module 138 may determine that an interesting event may be associated with malicious code based on these determinations and evaluations and may, in response, perform any or all of generating an event and providing the event to computing device 102 (e.g., for diagnostic or healing purposes), invoking the configuration module 140 to trigger a configuration update, invoking the healing module 142 to perform healing of computing devices 102 associated with the interesting event or deceiving of an adversary associated with the malicious code, or invoke the social module 144 to notify entities or persons associated with other computing device 102 of the potential malicious code. The analysis module 138 may also maintain and utilize one or more models, such as models specific to individual computing devices 102, to types of computing devices, to entities, or to a generic device. The analysis module 138 may update these models based on the received notifications and utilize the models in analyzing the interesting events. Additionally, the analysis module 138 may alert an administrator associated with the security service cloud 104 through the administrator UI 146.

In various embodiments, the configuration module 140 stored in memory 134 may generate configuration updates and provide those updates through the communications module 136. The configuration module 140 may generate device-specific configuration updates or configuration updates applicable to multiple devices. Such a configuration manager 140 may also be referred to as an ontology compiler and may be configured to provide security policies specific to hardware, OS, and language constraints of different computing devices 102. The configuration updates may include both updates responsive to interesting events and updates to the modules and data 116-122 comprising the kernel-level security agents 114. The configuration module 140 may generate and provide configuration updates responsive to a notification from the computing device 102 or independently of any prior notification from the computing device 102.

The healing module 142 may determine appropriate remedies to events determined to be associated with malicious code. For example, the healing module 142 may determine that an appropriate remedy is to halt a process associated with malicious code, to remove one or more executables, files, or registry keys, or to deceive malicious code by having it write to a dummy file rather than an operating system file, having it read falsified data, or falsifying a transmission associated with the malicious code. The healing module 142 may then instruct the kernel-level security agent 114 to perform the determined remedy. In some embodiments, the healing module 142 may provide the instructions via an event generated by the healing module 142 and provided to the kernel-level security agent 114.

In various embodiments, the social module 144 may share notifications of events determined to be associated with malicious code with individuals at other entities. The malicious code may not have affected the other entities yet, but they may be interested in learning about the malicious code. For example, if the malicious code affects devices of one defense department contractor, other defense department contractors may desire to know about the malicious code, as they may be more likely to be affected by it. The social module 144 may share notifications of malicious code and other information about the malicious code if both entities—the affected entity and the interested entity—agree to the sharing of the notifications.

In further embodiments, the administrative UI 146 may enable an administrator of the security service cloud 104 to be alerted to events determined to be associated with malicious code, to examine the data associated with those events, and to instruct the security service cloud 104 regarding an appropriate response. The administrative UI 146 may also enable an examination of the events and associated data by the administrator without first providing an alert.

In some instances, any or all of the computing device 102 or the devices 104 of the security service cloud 104 may have features or functionality in addition to those that FIG. 1 illustrates. For example, any or all of the computing device 102 or the devices 104 of the security service cloud 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within any or all of the computing device 102 or the devices 104 of the security service cloud 104 may reside remotely from that/those device(s), in some implementations.

Example Agent Architecture

Figure 2:
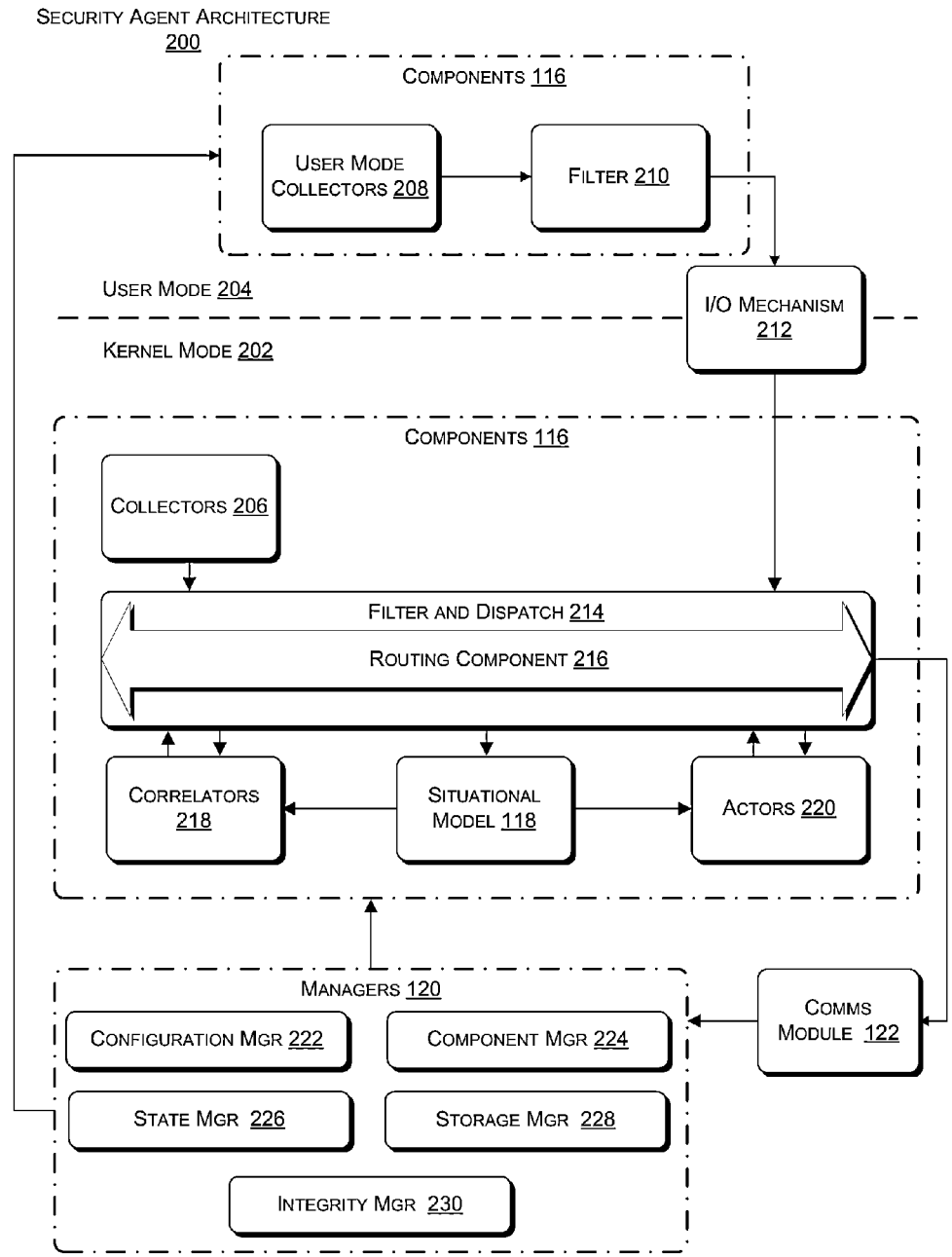
FIG. 2 illustrates an example architecture of the kernel-level security agent used in the network of FIG. 1, including a model, components, and managers.

FIG. 2 illustrates an example architecture of the kernel-level security agent, including a model, components, and managers. As illustrated, the security agent architecture 200 of the kernel-level security agent 114 includes modules and data 116-122 in a kernel mode 202 of the computing device 102 and components 116 in a user mode 204 of the computing device 102. In other embodiments, the security agent architecture 200 may only include the modules and data 116-122 in the kernel mode 202. The kernel mode 202 and user mode 204 correspond to protection domains—also known as rings—that protect data and functionality of the computing device 102 from faults and malware. Typically, a user mode, such as user mode 204, is associated with the outermost ring and the least level of privileges to access memory and functionality. This ring is often referred to as "ring 3" and includes many application processes. A kernel mode, such as kernel mode 202, is associated with an inner ring (sometimes the innermost ring, although in modern computing devices there is sometimes an additional level of privilege, a "ring-1") and a higher level of privileges to access memory and functionality. This ring is often referred to as "ring 0" and typically includes operating system processes.

In various embodiments, the security agent architecture 200 includes collectors 206. These collectors 206 are components 116 of the kernel-level security agent 114 that observe events associated with one or more processes, such as kernel mode processes. Events may include both actions performed by processes and non-occurrence of expected actions. For example, a collector 206 may register with a hook or filter driver offered by the operating system 124 to receive notifications of the occurrence or non-occurrence of certain events, such as file creates, reads and writes, and loading executables. A collector 206 may also monitor locations in memory 112 or log files 128, or spawn a thread to do so, observing events associated with the log files or memory locations. A collector 206 may observe multiple kinds of events, or each type of event may be associated with a different collector 206. The events observed by the collectors 206 may be specified by a configuration of the kernel-level security agent 114. In some embodiments, the collectors 206 observe all events on the computing device 102 and the configuration specifies configurable filters 214 for filtering and dispatching those events. In other embodiments, the configuration specifies which collectors 206 should be loaded to observe specific types of events. In yet other embodiments, the configuration both specifies which collectors 206 should be loaded and configurable filters 214 for filtering and dispatching events observed by those collectors 206.

As is further shown in FIG. 2, the security agent architecture 200 may include user mode collectors 208 to observe events that may not be visible to kernel mode processes. Such events could include, for example, rendering of display graphics for display on a display screen of the computing device 102. To observe these events, the kernel-level security agent 114 is further configured to load user mode collectors 208 as user mode modules of the computing device 102. Like collectors 206, user mode collectors 208 may observe multiple kinds of events, or each type of event may be associated with a different user mode collector 208. The events observed by the user mode collectors 208 may be specified by a configuration of the kernel-level security agent 114. In some embodiments, the user mode collectors 208 observe all user mode events on the computing device 102 and the configuration specifies configurable filters 210 for filtering and dispatching the events. In other embodiments, the configuration specifies which user mode collectors 208 should be loaded to observe specific types of events. In yet other embodiments, the configuration both specifies which user mode collectors 208 should be loaded and configurable filters 210 for filtering and dispatching those events.

As mentioned, the security agent architecture may further include configurable filters 210. The configurable filters 210 may be user mode components 116 of the kernel-level security agent 114 that filter user mode events observed by the user mode collectors 208 based on the configuration of the kernel-level security agent 114. The configurable filters 210 may perform any filtering of the user mode events that does not require querying of the situational mode 118 so as to maximize the filtering of user mode events performed in the user mode 204. Maximizing the filtering performed in the user mode 204 minimizes the number of observed user mode events that are transferred from user mode 204 to kernel mode 202 and thus conserves resources of the computing device 102.

In some embodiments, the filtered user mode events are transmitted between the user mode 204 and the kernel mode 202 by an input/output (I/O) mechanism 212 of the kernel-level security agent 114. The I/O mechanism 212 may be, for example, a ring buffer or other known mechanism for transmitting data between protection domains. In some embodiments, the I/O mechanism 212 is not a component of the kernel-level security agent 114 but, rather, is part of the other modules and data of the computing device 102.

In various embodiments, a filtering and dispatch component 214, representative of configurable filters 214 each associated with one or more of the collectors 206, routing component 216, correlators 218, situational model 118, actors 220, and/or communications module 122, receives observed events from the collectors 206 and user mode events from the via the I/O mechanism 212. While FIG. 2 illustrates the filtering and dispatch component 214 as being logically associated with the routing component 216, the filtering and dispatch component 214 may instead comprise one or more components (e.g., configurable filters 214) that are separate from the routing component 216. Upon receiving events, the filtering and dispatch component 214 may perform any filtering specified by the configuration of the kernel-level security agent 114. For example, the configuration may specify filtering of all received events or only of specific types of received events. Such filtering may, in some embodiments, involve querying the situational model 118 to determine attributes, behaviors, patterns, or other descriptions of the process that is associated with the event being filtered. The filtering may also involve application of one or more rules or heuristics of the configuration.

Upon filtering the events, the filtering and dispatch component 214 may dispatch the events using the routing component 216, which may be a throw-forward bus or other type of bus. The routing component 216 may in turn transmit events to any or all of correlators 218, the situational model 118, actors 220, or the communications module 122. In some embodiments, events that are significant in aggregate, but not alone, or events that do not necessitate the kernel-level security agent 114 to copy associated data associated with the events, are dispatched via the routing component 216 to the correlators 218. In some embodiment, these may be synchronous events that do not utilize a scheduler of the kernel-level security agent 114. In further embodiments, events that are significant in isolation or that necessitate the kernel-level security agent 114 to copy associated data associated with the events are dispatched via the routing component 216 to a scheduler of the kernel-level security agent 114 for scheduled delivery to the actors 220. As these events are dispatched to a scheduler, they may be asynchronous events.

In various embodiments, the correlators 218 are components 116 of the kernel-level security agent 114 that note the fact of the occurrence of specific types of events. Each correlator 218 may be specific to a single type of event or may be associated with multiple types of events. A correlator 218 may note the fact of the occurrence of a filtered event and, based at least in part on an association between the occurrence of the filtered event and at least one of a threshold, a set, a sequence, a Markov chain, or a finite state machine, take an action. For example, a correlator 218 may maintain a counter of the numbers of occurrences of an event (e.g., ten writes to file X) and, at some threshold, may generate an event to indicate that the number of occurrences of a type of event is potentially interesting. Such a threshold may be a set number specified in the configuration of the kernel-level security agent 114 or may be a number determined by querying the situational model 118 to determine the typical pattern of occurrences of the type of event within a time period. The generated event may indicate the type of observed event and the number of occurrences of the observed event. A correlator 218 that has generated an event may transmit the event via the routing component 216 to any or all of the situational model 118, an actor 220, or the communications module 122. In some embodiments, a configurable filter 214 of the filter and dispatch component 214 may be used to filter the event generated by the correlator 218.

In further embodiments, the situation model 118 of the kernel-level security agent 114 may comprise any one or more databases, files, tables, or other structures that track attributes, behaviors, and/or patterns of objects or processes of the computing device 102. These attributes, behaviors, and/or patterns may represent execution activities of processes and the situational model 118 may represent chains of execution activities providing genealogies of processes. The situational model 118 (also referred to herein as "the model") stores attributes, behaviors, and/or patterns of events, specific events, and forensic data associated with events. This data and other data stored by the situational model 118 may be indexed by specific events or by specific types of events. The situational model may receive events from the routing component 216 and be updated to include the received events by logic associated with the situational model 118. The situational model 118 may also be updated by actors 220 with forensic data that is associated with events and retrieved by the actors 220. Further, the situational model 118 may be configured to respond to queries from configurable filters 214, correlators 218, or actors 220 with descriptions of attributes, behaviors, and/or patterns of events or with descriptions of specific events.

In various embodiments, actors 220 of the kernel-level security agent 114 receive events from the scheduler of the kernel-level security agent 114. Each actor 220 may be specific to a type of event or may handle multiple types of events. Upon receiving an event, an actor 220 may determine if the event was observed by collectors 206 or user mode collectors 208 or was instead generated by a correlator 218 or security service cloud 104. The actor 220 may gather additional forensic data about the event. Such forensic data may include additional descriptions of the event and may be gathered by interfacing with the operating system 124. Upon gathering the forensic data, the actor 220 may update the situational model 118 with the forensic data. The actor 220 may also query the situational model 118 to determine attributes, behaviors, and/or patterns or other descriptions associated with the event. Based on those attributes, behaviors, and/or patterns, descriptions, or other rules or heuristics specified by the configuration of the kernel-level security agent 114, the actor 220 may determine that the event is interesting in some fashion and/or may be associated with malicious code.

Upon determining that an event is interesting, potentially associated with malicious code, or upon receiving an event generated by a correlator 218 or security service cloud, an actor 220 may update the situation model 118, may notify the security service cloud 104 of the event, or may heal the computing device 102. As mentioned above, the healing may involve halting a process associated with the event, deleting a process associated with the event (or malicious code associated with that process), or deceiving an adversary associated with malicious code that is in turn associated with the event. Such deceiving may be achieved by falsifying data acquired by the malicious code or by falsifying the data transmitted to the adversary. The action taken may be determined by the configuration of the kernel-level security agent 114. In some embodiments, an actor 220 may perform the healing responsive to receiving instructions from the security service cloud 104 to perform the healing. As mentioned above, such instructions may be provided via an event generated by the security service cloud 104.

In various embodiments, the security agent architecture 200 includes the communications module 122. The communications module 122 may represent network protocol stack(s), network interface driver(s), and any other network interface components utilized by the kernel-level security agent 114 to communicate with the security service cloud 104 over the network 106. The communications module 122 may, as illustrated in FIG. 2, be a kernel mode component of the computing device 102. Further, the communications module 122 may transmit events, other notifications, and data associated events from the kernel-level security agent 114 to the security service cloud 104. The communications module 122 may also transmit configuration updates received from the security service cloud 104 to a configuration manager 222 of the kernel-level security agent 114 and healing instructions and/or events from the security service cloud 104 to an actor 220.

As shown in FIG. 2, the security agent architecture includes a plurality of managers 120: a configuration manager 222, a component manager 224, a state manager 226, a storage manager 228, and an integrity manager 230. And as mentioned above, the configuration manager 222 may receive configuration updates from the security service cloud 104. The configuration manager 222 may receive the updates periodically or as needed. The configuration manager 22 then determines what changes to the kernel-level security agent 114 are needed to implement the configuration contained in the configuration update. For example, the configuration may specify a rule that creation of executables by Abobe Reader® is indicative of activity of malicious code and that any executions of such executables should be halted. To handle such a configuration, the configuration manager 222 may invoke the component manager 224 to load a new collector 206 to observe events associated with Adobe and files created by Adobe Reader®, a configurable filter 214 that notes and dispatches such events, and/or an actor 220 to gather forensic data responsive to creation of an executable by Adobe Reader® and to halt execution of the created executable responsive to the loading of that executable.

In another example, the configuration update may specify a new configuration manager 222. Responsive to such an update, the existing configuration manager 222 may invoke the component manager 224 to load the new configuration manager 222 and the integrity manager 230 to ensure continued observation while the configuration manager 222 is updated.

In various embodiments, the component manager 224 loads new components 116 and managers 120 designed to update or replace existing components 116 or managers 120. As mentioned, the component manager 224 is invoked by the configuration manager 222, which may inform the component manager 224 of which new component 116 or manager 120 is to be loaded, which component 116 or manager 120 is designated to be replaced or updated, and may specify a configuration of the new component 116 or manager 120 that implements the configuration update. The component manager 224 may then load the new component 116 or manager 120 while the existing/old component 116 or manager 120 continues to operate. After the new component 116 or manager 120 has been loaded, the component manager 224 or some other component 116 or manager 120 of the kernel-level security agent 114 may deactivate the existing/old component 116 or manager 120 that is now replaced by the new component 116 or manager 120.

In various embodiments, the state manager 226 may be invoked by the component manager 224 to share state of an existing/old component 116 with a new component 116. For example, if the component 116 is an actor 220 having an interface with the operating system 124, the state manager 226 may keep the state of that interface and pass the interface between the old/existing component 116 and the new component 116.

In some embodiments, the storage manager 228 may be an interface to the memory 112 capable of being invoked by other components 116 or managers 120 of the kernel-level security agent 114 to read from and write to the memory 112.

As mentioned above, the integrity manager 230 maintains continued observation while core components 116 and managers 120 are updated. The core components 116 and managers 120 are components 116 and managers 120 that always form part of an operating kernel-level security agent 114. Because updates of such core components 116 and managers 120 can open a window of vulnerability in which malicious code can go undetected, some measure of continued observation is needed during the updates. The integrity manager 230 provided this measure of continued observation by observing events and processes of the computing device 102 during the core component/manager updates. In some embodiments, the integrity module 230 may also be configured to detect attempts to delete it or other components 116 or managers 120 of the kernel-level security agent 114 and may prevent those attempts from succeeding.

Example Processes

Figure 3:
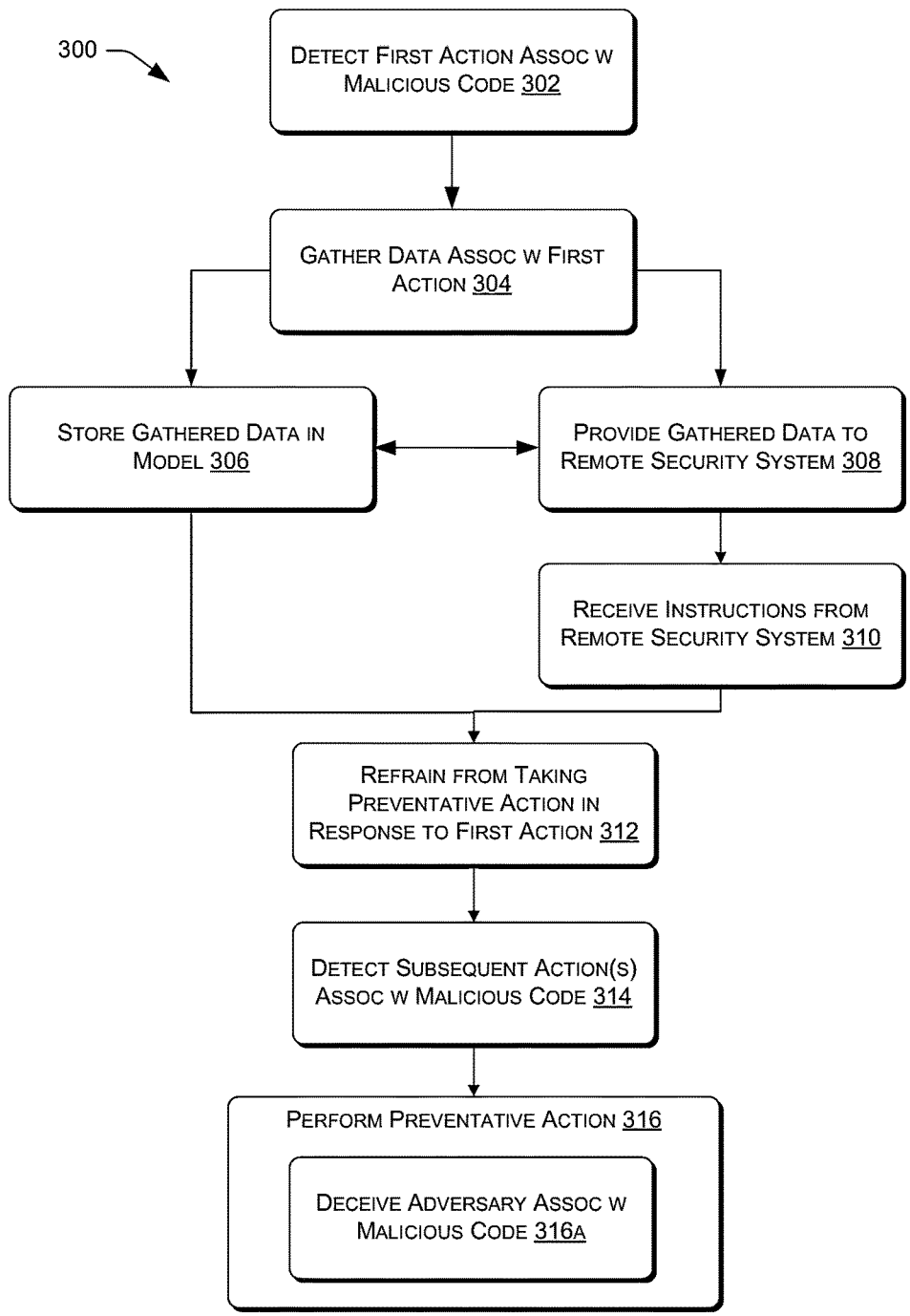
FIG. 3 illustrates an example process implemented by the kernel-level security agent used in the network of FIG. 1 for detecting a first action associated with malicious code, refraining from preventative action while gathering data, and, upon detecting subsequent action(s) associated with the malicious code, performing a preventative action.
Figure 4:
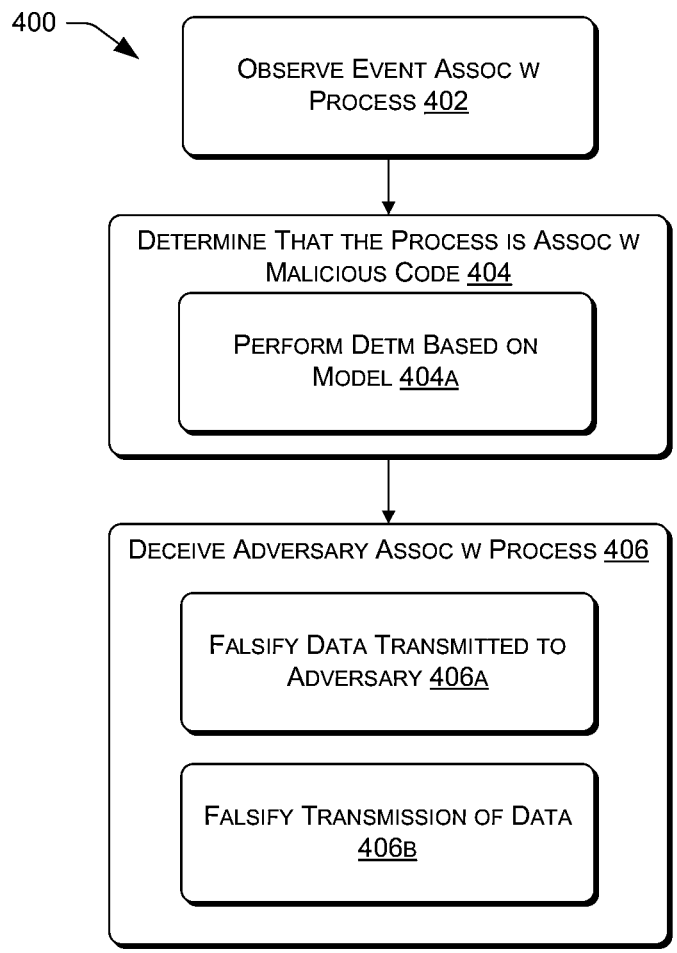
FIG. 4 illustrates an example process implemented by the kernel-level security agent used in the network of FIG. 1 for observing events, determining that the events are associated with malicious code, and deceiving an adversary associated with the malicious code.
Figure 5:
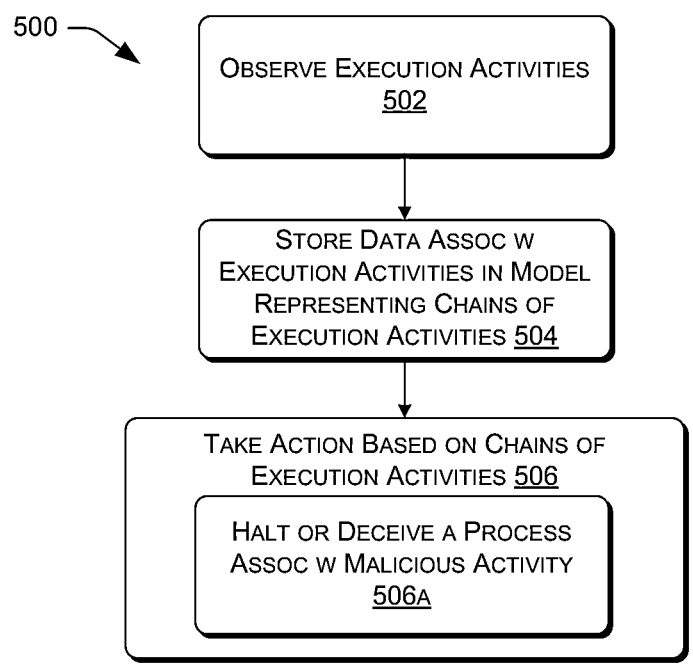
FIG. 5 illustrates an example process implemented by the kernel-level security agent used in the network of FIG. 1 for observing execution activities, storing data associated with the execution activities in a model that represents chains of execution activities, and taking action based on the chains of execution activities.

FIGS. 3-5 illustrate example processes 300, 400, and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 300 includes, at 302, a kernel-level security agent of a computing device detecting a first action associated with malicious code. At 304, responsive to detecting the first action, the kernel-level security agent gathers data associated with the first action. At 306, the kernel-level security agent may then store the gathered data in a model that tracks actions taken by processes of a system which executed the first action. Alternatively or additionally, at 308, the kernel-level security agent may inform a remote security service of the occurrence of the first action. At 310, in response, the kernel-level security agent receives from the remote security system instructions associated with the preventative action or a configuration update for configuring the kernel-level security agent. Also in response to detecting the first action, the kernel-level security agent refrains, at 312, from performing a preventative action.

At 314, the kernel-level security agent detects one or more subsequent actions associated with the malicious code and, in response at 316, performs a preventative action. The one or more subsequent actions occur after the first action. At 316*a*, the preventative action is preventing the one or more subsequent actions and further actions by the malicious process or deceiving the an adversary associated with the malicious code.

The process 400 includes, at 402, observing by a kernel-level security agent an event associated with a process executing on the computing device.

At 404, the kernel-level security agent determines, based at least in part on the observed event, that the process is associated with malicious code. At 404*a*, the determining comprises determining that the process is associated with malicious code based at least on part on a model that tracks processes of the computing device.

At 406, responsive to the determining at 404, the kernel-level security agent deceives an adversary associated with the malicious code. At 406*a*, the deceiving comprises falsifying data acquired by the malicious code. At 406*b*, the deceiving comprises falsifying the data transmitted to the adversary.

The process 500 includes, at 502, observing by a kernel-level security agent execution activities of one or more processes of the computing device.

At 504, the kernel-level security agent stores data associated with the one or more execution activities in a model of the kernel-level security agent, the model representing one or more chains of execution activities. In some embodiments, at least one of the chains of execution activities represents a genealogy of one of the processes.

At 506, the kernel-level security agent takes action based at least in part on the one or more chains of execution activities. At 506*a*, the taking action comprises halting or deceiving a process associated with malicious activity.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
a kernel-level security agent including a kernel-mode collector component, configurable filter(s), a routing component, and one or more kernel-mode event consumers, each of the kernel-mode collector component, configurable filter(s), routing component, and one or more kernel-mode event consumers being implemented at the kernel-level wherein:
the kernel-mode collector component is configured to be executed by the one or more processors to observe kernel-level events,
the configurable filter(s) are configured to be executed by the one or more processors to filter the observed events, including at least the kernel-level events,
the routing component is configured to be executed by the one or more processors to route one(s) of the filtered events to one(s) of the one or more kernel-mode event consumers, and
the one or more kernel-mode event consumers are configured to be executed by the one or more processors to take action based at least on one of the filtered events.

2. The system of claim 1, wherein the kernel-level security agent comprises a model to track attributes or behaviors of one or more objects or processes of the system, and the kernel-level security agent is further configured to update the model based at least in part on the filtered events.

3. The system of claim 2, wherein one or both of the configurable filter(s) or kernel-mode event consumers is configured to query the model.

4. The system of claim 1, wherein the kernel-level security agent comprises a communications module implemented at the kernel-level and configured to communicate with one or more remote systems.

5. The system of claim 1, wherein the action is informing a remote security system of the filtered events.

6. The system of claim 5, wherein the kernel-level security agent receives, in response, at least one of instructions for performing a further action or a configuration update.

7. The system of claim 1, wherein the kernel-level security agent receives one or more events, configuration updates, or instructions for performing actions from a remote security system independently of communications from the kernel-level security agent to the remote security system.

8. The system of claim 1, wherein the one or more kernel-mode event consumers include at least one correlator that notes the fact of the occurrence of the filtered events and, based at least in part on an association between the occurrence of the filtered events and at least one of a threshold, a set, a sequence, a Markov chain, or a finite state machine, takes the action.

9. The system of claim 1, wherein the one or more kernel-mode event consumers are to produce a new filterable event in response to receiving one or more of the filtered events.

10. The system of claim 1, wherein the one or more kernel-mode event consumers include at least one actor configured to perform at least one of:
gathering forensic data associated with an event,
storing the forensic data in a model,
informing a remote security system of the filtered events, or
taking an action to halt or deceive a process associated with one or more of the filtered events.

11. The system of claim 1, wherein the kernel-level security agent updates, replaces or removes one or more components of the kernel-level security agent while the kernel-level security agent continues to operate.

12. The system of claim 11, wherein an existing component of the kernel-level security agent designated to be replaced or removed continues to operate during an update of the kernel-level security agent.

13. The system of claim 1, wherein the kernel-level security agent comprises a scheduler to schedule asynchronous events for processing by the one or more kernel-mode event consumers.

14. The system of claim 1, wherein the kernel-level security agent performs at least one of:
observing events associated with multiple processes or threads in parallel,
filtering the multiple observed events in parallel,
routing the multiple filtered events in parallel, or
utilizing multiple kernel-mode event consumers in parallel.

15. The system of claim 1, wherein the kernel-level security agent utilizes the one or more kernel-mode event consumers to take action in response to a second event associated with a malicious code of the system, the second event occurring after observation of a first event by the kernel-level security agent.

16. The system of claim 1, wherein the kernel-level security agent includes at least one of:
a configuration manager to receive the configuration updates from a remote security system;
a component manager to load or unload a new component based on the configuration update;
a state manager to persist state information between old and new components;
a storage manager to interface with storage of the system on behalf of the kernel-level security agent, or
an integrity manager to observe, filter, and route events during an update of core components and managers of the kernel-level security agent.

17. The system of claim 1, wherein the kernel-level security agent comprises a hypervisor, one or more pre-boot components that leverages hardware-provided security features, or one or more pre-boot components that does not leverage hardware-provided security features.

18. The system of claim 1, wherein the kernel-level security agent comprises at least one user-mode collector to observe events in a user mode of the system and at least one user-mode configurable filter to filter events in the user mode of the system.

19. The system of claim 1, wherein the kernel-level security agent is a secure operating system that launches prior to a system operating system.

20. A computer-implemented method comprising:
observing, by a kernel-level security agent, events on a computing device;
filtering, by the kernel-level security agent, the observed events using configurable filters;
routing, by the kernel-level security agent, the filtered events to one or more kernel-mode event consumers of the kernel-level security agent; and
taking action, by the kernel-level security agent, based at least on one of the filtered events; and
receiving, from a remote security system, by the kernel-level security agent, instructions for performing a configuration update of at least one component of the kernel-level security agent.

21. The computer-implemented method of claim 20, further comprising tracking attributes or behaviors of one or more objects or processes of the system in a model of the kernel-level security agent and updating the model based at least in part on the filtered events.

22. The computer-implemented method of claim 20, wherein the taking the action includes informing the remote security system of the filtered events.

23. The computer-implemented method of claim 22, further comprising receiving, in response to the informing, instructions for performing a further action.

24. The computer-implemented method of claim 20, wherein taking the action comprises taking the action by one or more kernel-mode event consumers of the kernel-level security agent, and the one or more kernel-mode event consumers include at least one correlator that notes the fact of the occurrence of the filtered events and, based at least in part on an association between the occurrence of the filtered events and at least one of a threshold, a set, a sequence, a Markov chain, or a finite state machine, takes the action.

25. The computer-implemented method of claim 20, further comprising producing, by one or more kernel-mode event consumers of the kernel-level security agent, a new filterable event in response to receiving one or more of the filtered events.

26. The computer-implemented method of claim 20, wherein taking the action comprises taking the action by one or more kernel-mode event consumers of the kernel-level security agent, and the one or more kernel-mode event consumers include at least one actor configured to perform at least one of:
gathering forensic data associated with an event,
storing the forensic data in a model,
informing the remote security system of the filtered events, or
taking an action to halt or deceive a process associated with one or more of the filtered events.

27. The computer-implemented method of claim 20, further comprising updating, replacing or removing one or more components of the kernel-level security agent while the kernel-level security agent continues to operate.

28. The computer-implemented method of claim 20, further comprising:
observing events associated with multiple processes or threads in parallel,
filtering the multiple observed events in parallel,
routing the multiple filtered events in parallel, or
utilizing multiple kernel-mode event consumers in parallel.

29. One or more non-transitory computer-readable media having computer-executable instructions for a kernel-level security agent stored thereon and configured to program a computing device to perform, at the kernel level, operations comprising:
observing events on a computing device;
filtering the observed events using configurable filters; and
taking one or more security response actions based at least on one of the filtered events, wherein taking the one or more security response actions comprises informing a remote security system of the filtered events.

30. The one or more non-transitory computer-readable media of claim 29, wherein the one or more security response actions further include one of:
gathering forensic data associated with an event,
storing the forensic data in a model, informing the remote security system of the filtered events, or taking an action to halt or deceive a process associated with one or more of the filtered events.

* * * * *